Figure 1:
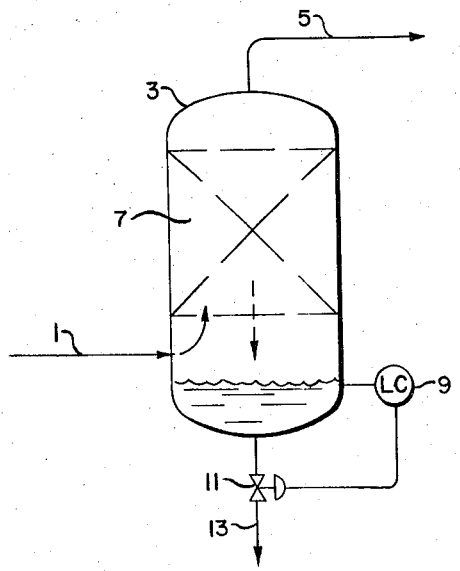

INVENTORS:
RICHARD B. OLNEY
CHANDLER H. BARKELEW
BY: Robert C. Clement
THEIR ATTORNEY

United States Patent Office 3,293,165
Patented Dec. 20, 1966

3,293,165
SEPARATION PROCESS FOR RESOLVING WATER
AND OIL SUSPENSION
Richard B. Olney, Berkeley, and Chandler H. Barkelew,
Orinda, Calif., assignors to Shell Oil Company, New
York, N.Y., a corporation of Delaware
Filed Apr. 5, 1963, Ser. No. 270,841
8 Claims. (Cl. 204—188)

This invention relates to a process for coalescing suspensions, emulsions, or foams. More particularly, this process relates to the resolution of suspensions, emulsions, or foams by contacting them with solid particles formed from two different materials having a different electron donating power wherein one of said materials has been electrolytically deposited on the surface of the other said material, and wherein the deposited material is partially removed to expose both deposited material and the other said material on the surface of each particle. In another aspect, the invention also relates to the novel particles, per se.

An increasing area of importance in today's industrial complex is that of finding some economical way of disposing of the unwanted by-products or wastes which result from the chemical synthesis or physical separation of many commercial products, particularly those produced in the petroleum industry. In oil refineries, chemical plants, and transportation systems there are needs for faster and more economical methods of coalescing dilute suspensions or emulsions. Increasingly severe pollution control standards are beginning to dictate expenditures in the millions of dollars to eliminate suspended oil or chemicals from waste water. Suspended water in jet fuels is of major concern; accidental traces of surface-active materials in jet fuel inactivate the normal filter-coalescers so that suspended water remains in the fuel transported to the air field where it provides a potential hazard to aircraft. Suspended water is also a problem in other fuels, oil products, and chemicals. The removal of catalysts from polymer solutions in the production of stereo-specific rubbers or adhesives often involves some difficulty of removing finely divided droplets of wash solution. These problems and others relating to the resolution of emulsions, suspensions, and dispersions has been the subject of much investigation and research.

In the past, electrolytic principles have frequently been employed to break suspensions. Most electrolytic means of breaking suspensions have been based on the fact that coalescence of one phase may follow the passage of an externally induced electric current through the suspension (i.e., induced from without the suspension), usually in the form of a high potential alternating current; and such systems and variations thereof have been the source of several patents in this field.

Moreover, it is known in breaking water-oil emulsions to disperse finely divided metal particles in the suspension by agitation during passage of an extraneously produced electric current. For such a method, note U.S. Patent No. 1,827,714, issued October 13, 1931, to Jacque C. Morrell. Therein, it is taught that metal, being a good conductor of electricity and being dispersed throughout the oil, substantially reduces the layer of oil through which the current may pass, thus facilitating the passage of the electric current generated by spaced electrodes on which a relatively high electrical potential difference is impressed.

Another improvement in electrical dehydration of oils is to use insoluble solid granules having water-wettable surfaces during the electrical treatment for the contacting of the minute particles comprising the dispersed substance, and to coalesce them into films coating the granules, and by reason of the heavier weight of the granules to carry the water films out of the electric field. This method is set forth in U.S. 2,030,198, by Marcel E. Cerf, issued February 11, 1936. Another scheme (set out in U.S. 2,045,-465, issued June 23, 1936, to G. L. Hassler) is to add a large concentration of granules to a dilute emulsion upon which a strong electric change is induced to serve as nuclei for the condensation of water from the emulsion and whereby their charge and lively agitation cause them to continually shake off drops of agglomerated water before they reach excessive (i.e., wherein chaining occurs) size.

Although devices and modifications such as the above, have served some purposes, they have not proved entirely satisfactory under all conditions of service for the reasons that considerable expense is involved in the equipment used, and apparatus of this type has an inherent lack of flexibility. That is, the apparatus or unit employed has certain physical limitations which limit the flow rate, type of suspension or stream which may be treated, etc.

Recently, it was discovered that it is possible to spontaneously coalesce colloidal dispersions of solids in a gas, solids in a liquid, liquids in a gas, liquids in a liquid, i.e., sols, emulsions, suspensions, or entrained gases (all of which are hereinafter referred to as "suspensions") by contacting the suspension with a bed of solid particles comprising a mixture of at least two different substances having a difference in electron withdrawing or donating power. This "spontaneous" (i.e., without the employment of an external electromotive force source) coalescense may be accomplished by "contacting," i.e., either (1) by passing the suspension or emulsion to be coalesced through the bed particles or (2) by passing the bed particles through the suspension or (3) by combinations of both (1) and (2). This new, flexible and inexpensive electrolytic process for the breaking and agglomerating of suspensions in process and/or waste streams which does not require the application of any external electrical force is set forth in the Fowkes and Anderson patent application Serial No. 210,947, filed July 19, 1962, and now abandoned.

While the process as disclosed in the above-application has proved to have substantial advantages over previously known processes, its practical application in some situations has been somewhat lessened by the discovery that under certain conditions of turbulent flow, or less turbulent flow but over periods of prolonged contacting times the particles tend to segregate as to types and the effectiveness of the spontaneous coalescence usually achieved is diminished. This effect is also noted, particularly in the case wherein the bed particles are passed through the suspension, i.e., by stirring, shaking, etc.

Now, in accordance with the instant invention, it has been discovered that it is possible to improve the life or extend the period of usable contact time during which the bed particles are effectively able to coalesce or resolve a suspension such as herebefore defined by employing novel finely divided bed particles wherein each particle is made up of at least two different materials having different electron donating powers or withdrawing capacities and wherein the particles are formed by the electrolytic deposition of one of said materials onto the surface of the other said material and removing at least a part of the deposited material from the surface of the particle so that both materials are at least partially exposed on the surface of each particle.

Improved efficiency of separation is achieved with the avoidance of the previously described tendency of the particles to separate into groups of the same type by using the specially prepared particles. This is possible without any substantial reduction of effectiveness in the degree of separation achieved when a mixture of different particles each of which is composed entirely of one material are employed. Thus, even though the particles are formed by electrolytically uniting the different substances together so that both types of substances are in contact with each other in each particle, the influence of the field does not appear substantially lessened, and separation of the agglomeration or suspension being treated is possible without the disadvantage present when mixtures of particles are employed wherein each particle is derived from entirely one substance.

Therefore, the principal advantages of the instant invention are (1) the instant process is easier to operate since problems associated with mixing the particles to form the bed and establishing an equal distribution of particles throughout the bed is obviated, and (2) the bed does not tend to segregate as to particle type or rearrange itself by the accumulation or settling of one type of material into pockets in which the other type of material is not present.

Other features and advantages of the instant invention will become apparent from the following description and the annexed drawing, which consists of two figures; FIGURE 1, illustrating a conventional upflow coalescer arrangement, and FIGURE 2, illustrating a downward flow variation.

Referring to FIGURE 1, the cloudy suspension to be treated comprising a small amount of water dispersed in kerosene, is introduced through line 1 into the column 3. The liquid introduced flow upward contacting and passing through the bed 7 composed of particles formed from two different substances having different electron donating capacities formed by electrolytically depositing one substance on the other. The droplets containing substantially only water coalesce on the bed particles and are thereby removed from the upflowing feed. The latter is removed as a clear hydrocarbon phase from line 5. The coalesced water droplets pass downwardly through the bed and into the settling zone in the bottom of the column 3. The water may then be removed through line 13 by means of a conventional liquid level controller 9 and valve 11.

Figure 2:
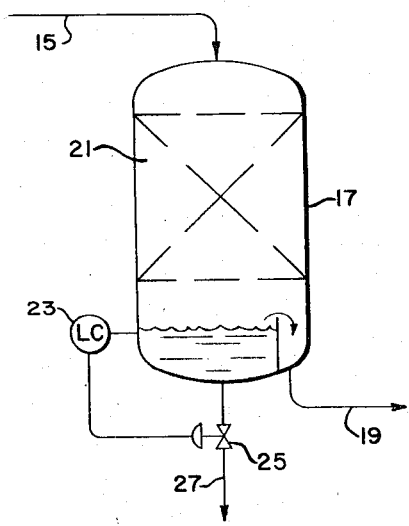

FIGURE 2 illustrates a downward flow variation of the inventive process. In this embodiment a cloudy water-in-kerosene suspension is introduced to the column 17 and into the bed of particles contained there 21, by means of line 15. Then the suspension passes downwardly through the bed with the water coalescing into droplets. The droplets of water and kerosene then flow downwardly to the bottom of the column to a settling zone from which the water is removed as a separate phase through line 27 by means of valve 25 and liquid level controller 23 and the clear kerosene is recovered from line 19.

All materials or substances which have a difference in electron donating or withdrawing power and which are capable of being electrolytically deposited on each other are suitable to use as the "two different" materials forming the particles used in the bed in the instant invention. Particularly desirable are combinations of metals and/or metal alloys and/or oxides, e.g., iron-aluminum, chrome-aluminum, copper-zinc, tin-iron, copper-aluminum, solders, and the like.

Specific examples of metals which are suitable for use in the instant invention are: Li, K, Ca, Na, Mg, Al, Zn, Cr, Fe, Cd, Ni, Sn, Pb, Cu, Hg, Ag, and Mn. Particularly desirable combinations of substances for forming the individual particles are those which have a sufficient difference in electron donating or withdrawing capacity such that their relative (i.e., the arithmetic difference in electrode potential) electrode potential exceeds about 1 volt. The electrode potential of many of the suitable materials may be determined by reference to the Electromotive Force Series of Elements, such as found on page 1521 of The Handbook of Chemistry and Physics, thirty-second edition.

Any conventional manner of partially removing the substance which is electrolytically deposited on the other substance to effect exposure of both substances on the surface may be utilized. Slight abrasion of the particles which is achieved merely by shaking the particles together is adequate, although other equivalent means to achieve this purpose may be employed such as rubbing with an abrasive substance, etc.

Furthermore, the relative proportion of the surface area of each of the types of substances employed to make up the individual particle may vary within wide ranges with about a one-to-one surface area ratio most preferred; however, a surface area ratio of from about 1:100 to about 100:1 may also be utilized.

As previously mentioned, the suspension which may be treated by the employment of the instant invention includes colloidal suspensions, water and oil (hydrocarbon or non-hydrocarbon) emulsions, entrained gases, etc. In general, any system wherein electrically charged particles, droplets or gas bubbles are present in liquids may be advantageously treated. Desirable for treatment are dilute aqueous petroleum refinery waste emulsions, carbon-in-oil suspensions, dilute water-in-oil emulsions or hazes such as that formed in the residual aqueous wash water used in the removal of catalyst by extraction and washing techniques from polymer solutions, and in smokes, mists, etc. Also, particularly preferred is the treatment of dilute emulsions (sometimes referred to as "hazes") of water in kerosene (i.e., jet fuel haze) and other water and light hydrocarbon emulsions, such as water in liquid propane. This process may additionally be employed in desalting of fluid crude oils.

The specific process variables may obviously be modified depending upon the suspension being treated and the particular substances making up the bed; but, for any given system and degree of separation required, these variables are readily determined by those of ordinary skill in the art.

The average particle size of the particles used in the bed may generally vary between wide limits in the instant process; conventional bed packing sizes such as from about 60 mesh up to about one inch may be used. A particularly desired size range is from about 5 to about 40 mesh.

Although, as stated previously, the electrolytic deposition and abrading to form the particles may be achieved in any conventional manner, the following example of one preferred way is included:

EXAMPLE I

Aluminum particles having a mesh size of from 14–20 are mixed with one liter of an aqueous copper plating solution comprising about 45 grams of copper cyanide, 67.5 grams of sodium cyanide, 60.0 grams of Rochelle salt, and about 15 grams of caustic potash. A current of about 3 amps is passed through the solution for a time sufficient to cover the aluminum particles with a fine deposit of copper. The particles are then recovered from the solution, shaken to separate and to slightly abrade each particle.

The apparatus employed in this process may be any conventional or convenient type known to those skilled in the art. Following the bed, any type of conventional separation device may be employed at the exit, such as a settler, hydroclone, etc. Any other auxiliary equipment such as valves, by-passes, controlling devices, etc., that may be necessary for the proper operation of the process may be employed; the inclusion of which will be evident to those skilled in the art.

While most of the description of the instant process above has been directed to the situation where a liquid suspension is "contacted" with the bed particles by passing the liquid through a stationary bed, it is apparent that the bed particles may be circulated through the liquid by means of conventional stirring devices, shakers, etc., to achieve a similar effect; and the term "contacted" should be construed to include all of these means.

While in any given application, the bed size is a function of the residence time and the velocity of the material passing through the bed, these factors also may vary within wide values. For example, it is generally desirable to have a minimum residence time of about 0.1 second up to any residence time desired. However, a preferred range is from about 3 seconds to 50 minutes. The velocity, of course, will be fixed by the bed size and the particular residence time desired; however, the general operating velocity may vary from about 0.1 foot per minute and lower, up to about 10 feet per minute and higher. The most desirable range of velocities employed are from about .5 to about 3 feet per minute.

The invention is further illustrated, but not limited by the following specific examples of the inventive process.

EXAMPLE II

An emulsion of 1000 p.p.m. of oil in water having an observable hazy appearance is passed through a bed of bimetallic particles of 14–20 mesh size prepared in accordance with Example I by electrolytically plating copper on aluminum followed by mild abrasion to expose segments of the plated metal on each particle. The effluent recovered from passage of the emulsion through the bed is visually sparkling clear.

EXAMPLE III

An emulsion similar to that described in Example II is passed through a bed of bimetallic particles of 14–20 mesh size formed by electrolytically plating copper on iron. The effluent recovered therefrom is clear.

To further demonstrate the effectiveness of the instant process, three types of filters were compared. In the first type, the particles making up the bed were entirely composed of a single metal. The second type employed a 50–50 volume mixture of metal particles wherein each particle was entirely composed of one metal, and the third type was formed from particles each of which were composed of two separate metals. In all of the tests, which are summarized below in Table 1, particles of 14–20 mesh size were employed and the emulsion to be treated was passed at a rate of 2 ml./minute through a bed volume of 27 ml. The aqueous effluent therefrom was visually observed regarding its clarity. The emulsion employed in the tests comprised 1000 p.p.m. of a hydrocarbon oil boiling in the kerosene range dispersed in water.

*Table I*

| Particle type: | Condition of effluent |
|---|---|
| Copper only | Did not clear. |
| Iron only | Slightly clear. |
| Iron+copper (mixed) 50–50% by volume | Partly clear (more clear than Fe only). |
| Iron+copper (plated and abraded)[1] | Clear. |

[1] These particles were formed by plating iron particles with copper and then slightly abrading the particles by rubbing with emery cloth until some iron is exposed.

These data clearly show that the plated particles cleared the emulsion better than the individual metals alone or even when the separate metals are physically mixed together.

We claim as our invention:

1. A process for resolving a suspension comprising water and oil into two phases which comprises (1) contacting the suspension with particles of solids in finely divided form wherein each of said particles is formed by electrolytically depositing one solid onto a different solid having a different electron donating capacity and abrading to expose at least part of each of said solids on the surface of the particle and (2) recovering the constituents of the suspension as two substantially separate phases.

2. In a process for coalescing and agglomerating a suspension of water in a liquid hydrocarbon wherein said suspension is contacted in a contacting zone with finely divided particles having a particle size of from about 60 mesh up to about one inch, for a residence time of from about .1 second up to about 50 minutes and wherein the water and liquid hydrocarbon are recovered, the improvement which comprises utilizing particles each of which have been made up of at least two different materials having a different electron donating power wherein the particles are formed by electrolytically depositing one of said materials onto the other of said materials and abrading to expose at least part of each of said materials on the surface of said particle.

3. A process for agglomerating a suspension comprising water and oil which comprises:
   (1) contacting the suspension in a contacting zone with finely divided particles wherein each of said particles is composed of two different materials each of which possesses a different electron donating power and is formed by electrolytically depositing one of said materials onto the other of said materials and partially exposing at least part of each of said materials on the surface of said particle; and
   (2) recovering the constituents of the suspension as two substantially separate phases.

4. The process of claim 3 wherein the suspension is a petroleum refinery waste stream.

5. The process of claim 3 wherein the suspension is a water-in-oil emulsion.

6. The process of claim 3 wherein the particles are formed from copper and aluminum.

7. The process of claim 3 wherein the particles are formed from copper and iron.

8. The process of claim 3 wherein the particles are formed from two metals which have a relative electrode potential which exceeds about 1 volt.

References Cited by the Examiner

UNITED STATES PATENTS

| 1,591,286 | 7/1926 | Dahlstrum | 204—248 |
| 1,887,774 | 11/1932 | Meinzer | 208—188 |
| 2,425,919 | 8/1947 | Cox | 204—10 |

JOHN H. MACK, *Primary Examiner.*

T. TUFARIELLO, *Assistant Examiner.*